(12) United States Patent
Aso et al.

(10) Patent No.: US 10,347,131 B2
(45) Date of Patent: *Jul. 9, 2019

(54) COLLISION DETERMINATION DEVICE (71) Applicant: TOYOTA JIDOSHA KABUSHIKI KAISHA, Toyota-shi, Aichi-ken (JP)

(72) Inventors: Kazuaki Aso, Susono (JP); Toshiki Kindo, Yokohama (JP); Katsuhiro Sakai, Hadano (JP); Masahiro Harada, Atsugi (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 215 days.

This patent is subject to a terminal disclaimer.

(21) Appl. No.: 15/241,697

(22) Filed: Aug. 19, 2016

(65) Prior Publication Data

US 2016/0358476 A1 Dec. 8, 2016

Related U.S. Application Data

(63) Continuation of application No. 13/877,337, filed as application No. PCT/JP2010/067450 on Oct. 5, 2010, now Pat. No. 9,601,020.

(51) Int. Cl.
*G08G 1/16* (2006.01)
*B60W 30/095* (2012.01)

(52) U.S. Cl.
CPC .......... *G08G 1/166* (2013.01); *B60W 30/0953* (2013.01); *B60W 30/0956* (2013.01); *G08G 1/161* (2013.01)

(58) Field of Classification Search
CPC .......... G08G 1/16; G08G 1/166; G08G 1/161; B60W 30/095; B60W 30/0953; B60W 30/0956

See application file for complete search history.

(56) References Cited

U.S. PATENT DOCUMENTS 5,341,344 A    8/1994  O'Brien et al.
5,631,639 A    5/1997  Hibino et al.
(Continued)

FOREIGN PATENT DOCUMENTS

JP    2005-208849    8/2005
JP    2009-230455    10/2009
(Continued)

*Primary Examiner* — Peter D Nolan
(74) *Attorney, Agent, or Firm* — Finnegan, Henderson, Farabow, Garrett & Dunner, LLP (57) ABSTRACT

A collision determination device determines the possibility of collision between a host vehicle and the other object on the basis of a shortest arrival time calculated by a shortest arrival time calculation unit and a passage time at each point of the host vehicle acquired by a vehicle route candidate acquisition unit. In this way, even if a locus to be taken by the other object is not generated, the shortest arrival time at which the other object can arrive at each point of the route candidate of the host vehicle with a predetermined first displacement is calculated, thereby determining the possibility of collision between the host vehicle and the other object. Therefore, it is possible to reduce a computational load for determining collision and to accurately determine collision between the host vehicle and the other object.

4 Claims, 10 Drawing Sheets

(56) References Cited

U.S. PATENT DOCUMENTS

| | | | |
|---|---|---|---|
| 6,150,932 | A | 11/2000 | Kenue |
| 6,590,495 | B1 | 7/2003 | Behbehani |
| 7,545,261 | B1 | 6/2009 | Harrington |
| 2004/0073367 | A1 | 4/2004 | Altan et al. |
| 2004/0122587 | A1 | 6/2004 | Kanemitsu |
| 2005/0073438 | A1 | 4/2005 | Rodgers et al. |
| 2007/0288133 | A1 | 12/2007 | Nishira et al. |
| 2007/0294019 | A1 | 12/2007 | Nishira et al. |
| 2008/0061958 | A1 | 3/2008 | Birk et al. |
| 2008/0061999 | A1 | 3/2008 | Birk et al. |
| 2008/0084283 | A1 | 4/2008 | Kalik |
| 2008/0309468 | A1 | 12/2008 | Greene et al. |
| 2008/0312831 | A1* | 12/2008 | Greene ........... G08G 1/165 701/301 |
| 2009/0012703 | A1 | 1/2009 | Aso et al. |
| 2009/0024357 | A1 | 1/2009 | Aso et al. |
| 2009/0052740 | A1 | 2/2009 | Sonoura |
| 2009/0076702 | A1 | 3/2009 | Arbitmann et al. |
| 2010/0057361 | A1 | 3/2010 | Caveney et al. |
| 2010/0063735 | A1 | 3/2010 | Kindo et al. |
| 2010/0121576 | A1 | 5/2010 | Aso et al. |
| 2010/0318240 | A1 | 12/2010 | Kindo et al. |
| 2011/0035150 | A1 | 2/2011 | Sundarraj et al. |
| 2011/0087433 | A1 | 4/2011 | Yester |
| 2011/0196568 | A1 | 8/2011 | Nickolaou et al. |

FOREIGN PATENT DOCUMENTS

| | | |
|---|---|---|
| JP | 4353192 | 10/2009 |
| JP | 2010-30354 | 2/2010 |
| JP | 2010-287093 | 12/2010 |
| JP | 2012-79215 | 4/2012 |

\* cited by examiner

SHORTEST ARRIVAL TIME t_min (b)

LONGEST STOPOVER TIME t_max

SHORTEST ARRIVAL TIME tmin (b)

LONGEST STOPOVER TIME tmax

COLLISION DETERMINATION DEVICE

CROSS REFERENCE TO RELATED APPLICATIONS

This application is a continuation of U.S. patent application Ser. No. 13/877,337, filed Jun. 21, 2013, which is a national phase application of International Application No. PCT/JP2010/067450, filed Oct. 5, 2010, the content of both of which is incorporated herein by reference.

TECHNICAL FIELD

The present invention relates to a collision determination device.

BACKGROUND ART

In the related art, as a route evaluation device which evaluates a route of a mobile object, a route setting device which evaluates and sets a route to be taken by a specific object from among a plurality of objects is known (for example, see Japanese Patent No. 4353192). In the route setting device, change in a position to be taken by each of a plurality of objects over time is generated as a spatiotemporal locus constituted by time and space. The routes of a plurality of objects are predicted using the locus, and the degree of interference between a route to be taken by a specific object and a route to be taken by the other object is quantitatively calculated on the basis of the prediction result. A route on which the specific object is most unlikely to interfere with the other object is determined as a route which should be taken by the specific object.

CITATION LIST

Patent Literature

[Patent Literature] Japanese Patent No. 4353192

SUMMARY OF INVENTION

Technical Problem

On the other hand, although in the route setting device of the related art, a locus of an object is generated, and the degree of interference is calculated on the basis of the route of the object predicted by the locus, the traveling efficiency of the host vehicle is not taken into consideration. If control is performed taking into consideration the traveling efficiency of the host vehicle in the route setting device of the related art, a processing load increases with an increase in the amount of computation, and realizability is lacking. Accordingly, in order to secure the traveling efficiency of the host vehicle while avoiding collision, it is necessary to make a further improvement with respect to the processing load.

The invention has been accomplished in order to solve the above-described problems, and an object of the invention is to provide a collision determination device capable of reducing a processing load while avoiding collision with the other object.

Solution to Problem

In order to solve the above-described problems, a collision determination device according to an aspect of the invention includes vehicle route candidate acquisition means for acquiring a route candidate of a host vehicle, other object status acquisition means for acquiring the status of the other object, shortest arrival time calculation means for calculating a shortest arrival time, at which the other object can arrive at each point of the route candidate of the host vehicle acquired by the vehicle route candidate acquisition means when moving with a predetermined first displacement, on the basis of the status of the other object acquired by the other object status acquisition means, and collision determination means for determining the possibility of collision between the host vehicle and the other object on the basis of the shortest arrival time calculated by the shortest arrival time calculation means and the passage time at each point of the route candidate of the host vehicle.

In the collision determination device, the possibility of collision between the host vehicle and the other object is determined on the basis of the shortest arrival time calculated by the shortest arrival time calculation means and the passage time at each point of the route candidate of the host vehicle acquired by the vehicle route candidate acquisition means. In this way, even if a locus to be taken by the other object is not generated, the shortest arrival time at which the other object can arrive at each point of the route candidate of the host vehicle with the predetermined first displacement is obtained, whereby the possibility of collision between the host vehicle and the other object can be determined. Therefore, it is possible to reduce a computational load for determining collision and to accurately determine collision between the host vehicle and the other object. In this way, in the collision determination device, it is possible to reduce a processing load while avoiding collision with the other object.

It is preferable that, when the shortest arrival time calculated by the shortest arrival time calculation means is smaller than the passage time at each point of the route candidate of the host vehicle, the collision determination means determines that there is a possibility that the host vehicle collides with the other object. When the shortest arrival time is greater than the passage time at each point of the route candidate of the host vehicle, collision between the host vehicle and the other object is avoided. Therefore, with the use of the relationship that the shortest arrival time is smaller than the passage time at each point of the route candidate of the host vehicle (shortest arrival time<passage time), it is possible to more appropriately determine the possibility of collision between the other object and the host vehicle.

It is preferable that, when the shortest arrival time calculated by the shortest arrival time calculation means is smaller than the passage time at each point of the route candidate of the host vehicle, and when the speed of the host vehicle is higher than a predetermined speed, the collision determination means determines that there is a possibility that the host vehicle collides with the other object. With this configuration, since the traveling status of the host vehicle is taken into consideration so as to determine the possibility of collision, it is possible to more accurately determine the possibility of collision between the host vehicle and the other object.

It is preferable that the collision determination device further includes longest stopover time calculation means for calculating a longest stopover time, at which the other object passes through each point of the route candidate of the host vehicle acquired by the vehicle route candidate acquisition means when reducing speed with a predetermined second displacement, on the basis of the status of the other object acquired by the other object status acquisition means, wherein, when the shortest arrival time calculated by the shortest arrival time calculation means is smaller than the passage time at each point of the route candidate of the host vehicle, and the longest stopover time calculated by the longest stopover time calculation means is greater than the passage time at each point of the route candidate of the host vehicle, the collision determination means determines that there is a possibility that the host vehicle collides with the other object. With this configuration, since the possibility of collision is determined on the basis of a plurality of movement statuses of the other object, it is possible to determine the possibility of collision between the host vehicle and the other object with higher precision. As a result, it is possible to improve reliability. The "longest stopover time at which the other object passes through each point" represents the latest time at which the other object passes by each point.

It is preferable that the collision determination device further includes route candidate correction means for correcting the route candidate of the host vehicle acquired by the vehicle route candidate acquisition means to a route candidate when the host vehicle takes avoidance behavior from a predetermined point, wherein the shortest arrival time calculation means calculates the shortest arrival time at which the other object arrives at each point of the route candidate of the host vehicle corrected by the route candidate correction means when moving with a predetermined first displacement, and when the shortest arrival time calculated by the shortest arrival time calculation means is smaller than the time at which the other object passes through each point of the route candidate of the host vehicle corrected by the route candidate correction means, the collision determination means determines that there is a possibility that the host vehicle collides with the other object. With this configuration, for example, when passing by an immediate pedestrian as the other object, since failure of selection of only a route candidate in which the host vehicle starts to reduce speed from the front side of the position of the pedestrian is avoided, it is possible to maintain the traveling efficiency of the host vehicle. Here, "to take avoidance behavior" includes behavior, such as reduction in speed, increase in speed, or steering.

It is preferable that the longest stopover time calculation means calculates the longest stopover time at which the other object passes through each point of the route candidate of the host vehicle corrected by the route candidate correction means when reducing speed with a predetermined second displacement, and when the shortest arrival time calculated by the shortest arrival time calculation means is smaller than the time at which the other object passes through each point of the route candidate of the host vehicle corrected by the route candidate correction means, and when the longest stopover time calculated by the longest stopover time calculation means is greater than the time at each point of the route candidate of the host vehicle, the collision determination means determines that there is a possibility that the host vehicle collides with the other object. With this configuration, since the possibility of collision is determined on the basis of a plurality of movement statuses of the other object, it is possible to determine the possibility of collision between the host vehicle and the other object with higher precision. As a result, it is possible to improve reliability.

Advantageous Effects of Invention

According to the aspect of the invention, it is possible to reduce a processing load while avoiding collision with the other object. Therefore, it is possible to secure the traveling efficiency of the host vehicle.

DESCRIPTION OF EMBODIMENTS

Hereinafter, preferred embodiments of the invention will be described with reference to the drawings.

First Embodiment

Figure 1:
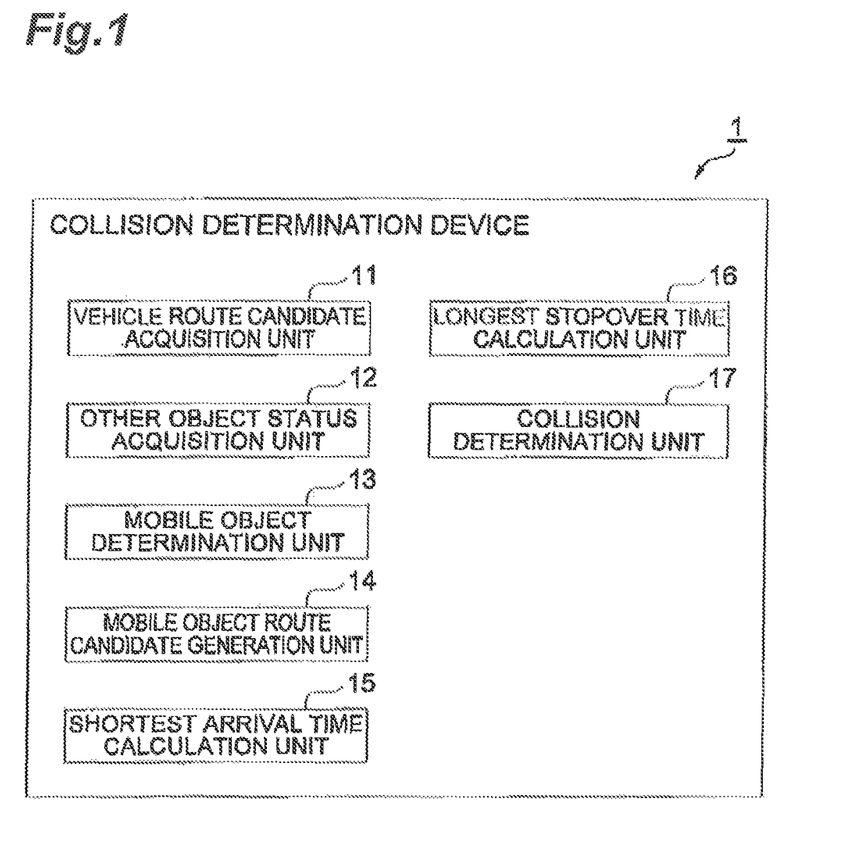
FIG. 1 is a block diagram showing the configuration of a collision determination device according to a first embodiment.

FIG. 1 is a block diagram showing the configuration of a collision determination device according to a first embodiment of the invention. As shown in FIG. 1, a collision determination device 1 includes a vehicle route candidate acquisition unit (vehicle route candidate acquisition means) 11, a mobile object status acquisition unit (other object status acquisition means) 12, a mobile object determination unit 13, a mobile object route candidate generation unit 14, a shortest arrival time calculation unit (shortest arrival time calculation means) 15, a longest stopover time calculation unit (longest stopover time calculation means) 16, and a collision determination unit (collision determination means) 17. The collision determination device 1 is an electrical control unit (ECU) which has a central processing unit (CPU) performing computation, a read only memory (ROM) storing a program or the like for causing the CPU to execute respective processing, a random access memory (RAM) storing various kinds of data, such as the computation result, and the like.

The vehicle route candidate acquisition unit 1 acquires a route candidate of the host vehicle. The route candidate of the host vehicle is a future route candidate which is generated from information, such as the position, speed, and direction of the host vehicle, by a route candidate generation unit, and preferably includes information of each point (position: x,y) of the host vehicle at a certain time (t). The vehicle route candidate acquisition unit 11 outputs host vehicle route candidate information representing the acquired route candidate of the host vehicle to the shortest arrival time calculation unit 15, the longest stopover time calculation unit 16, and the collision determination unit 17. In regard to the route candidate, similar information can be output by appropriate calculation processing from information of the position (x,y) and the speed (Vx,Vy).

The mobile object status acquisition unit 12 acquires a present status of a mobile object. The mobile object is a pedestrian (including a bicycle), the other vehicle, or the like, and the present status of the mobile object is information necessary for calculating the time until the mobile object reaches at a certain time, and is preferably the position, speed, and direction of the mobile object, an acceleration, a yaw rate, a tire angle, or the like. Of course, when an appropriate assumption is placed on the mobile object, part of these kinds of information can be omitted. The mobile status may be detected from ambient information including an object in the vicinity of the host vehicle, the position of the other vehicle, or the like, or may be detected by vehicle-to-vehicle communication or the like. The mobile object status acquisition unit 12 outputs mobile object status information representing the acquired status of the mobile object to the shortest arrival time calculation unit 15 and the longest stopover time calculation unit 16. The ambient information including the object in the vicinity of the host vehicle, the position of the other vehicle, or the like is acquired by a traveling status acquisition unit (not shown). The traveling status acquisition unit acquires a traveling status including vehicle traveling information, such as the vehicle speed or the steering angle, the ambient information, such as the object in the vicinity of the host vehicle or the position and speed of the other vehicle, and traveling road information, such as a map.

The mobile object determination unit 13 determines how a mobile object moves from now. For example, the mobile object determination unit 13 executes image processing on the basis of image information of an image photographed by a camera mounted in the host vehicle and determines whether a mobile object is a pedestrian or a vehicle. When it is determined that a mobile object is a vehicle, it is hereinafter regarded that the mobile object comparatively observes a condition (traffic classification, road direction, or the like) that the movement of the mobile object is permitted. When it is determined that the mobile object is a pedestrian, it is hereinafter regarded that the mobile object does not comparatively observe a condition (traffic classification, road direction, or the like) that the movement of the mobile object is permitted. The mobile object determination unit 13 outputs determination result information representing the determination result to the mobile object route candidate generation unit 14, the shortest arrival time calculation unit 15, and the longest stopover time calculation unit 16. The determination of the mobile object may be performed on the basis of the previous motions of the mobile object. As the type of the mobile object, a vehicle (for example, a two-wheeled vehicle) which does not comparatively observe a condition that the movement is permitted, a pedestrian who observes the condition, or the like may be determined.

The mobile object route candidate generation unit 14 calculates a route candidate of a mobile object. If the determination result information output from the mobile object determination unit 13 is received, when the determination result information represents that the mobile object is the other vehicle (vehicle), the mobile object route candidate generation unit 14 calculates a road network (route candidate) representing the integrated state of a road which the other vehicle should follow on the basis of information regarding the shape or the like of a road in the vicinity of the other vehicle. The mobile object route candidate generation unit 14 outputs mobile object route information representing the calculated route candidate of the mobile object to the shortest arrival time calculation unit 15 and the longest stopover time calculation unit 16.

The shortest arrival time calculation unit 15 calculates the shortest arrival time at which the mobile object arrives at each point of the route candidate of the host vehicle when moving from an initial speed with a predetermined first displacement. If the mobile object status information output from the mobile object status acquisition unit 12 is received and the determination result information output from the mobile object determination unit 13 is received, when the determination result information represents that the mobile object is a pedestrian, the shortest arrival time calculation unit 15 calculates the shortest arrival time $t_{min}$ at which the mobile object can arrive at each point of the route candidate of the host vehicle when increasing speed from the initial speed to a predetermined maximum speed at a predetermined acceleration (first displacement: for example, 0.3 G). The shortest arrival time calculation unit 15 provides information relating to the calculated shortest arrival time $t_{min}$ to road data and outputs road data information relating to road data to the collision determination unit 17.

When the determination result information represents that the mobile object is a vehicle, the shortest arrival time calculation unit 15 calculates the shortest arrival time $t_{min}$, at which the mobile object can arrive at each point of the road network of the mobile object when increasing speed from the initial speed to a predetermined maximum speed (a maximum speed provided to the road network+α) at a predetermined acceleration, on the basis of the mobile object route information output from the mobile object route candidate generation unit 14. The shortest arrival time calculation unit 15 provides information relating to the calculated shortest arrival time $t_{min}$ to the road network and outputs road network information relating to the road network to the collision determination unit 17.

The longest stopover time calculation unit 16 calculates the longest stopover time (the latest time at which the mobile object passes by each point) at which the mobile object passes through each point of the route candidate of the host vehicle when reducing speed from the initial speed with a predetermined second displacement. If the mobile object status information output from the mobile object status acquisition unit 12 is received and the determination result information output from the mobile object determination unit 13 is received, when the determination result information represents that the mobile object is a pedestrian, for each point of the route candidate of the host vehicle, the longest stopover time calculation unit 16 calculates the longest stopover time $t_{max}$ at which the mobile object passes through each point of the route candidate of the host vehicle when reducing speed from the initial speed to a predetermined minimum speed at a predetermined deceleration (second displacement: for example, −0.3 G). The longest stopover time calculation unit 16 provides information relating to the calculated longest stopover time $t_{max}$ to road data and outputs road data information relating to road data to the collision determination unit 17.

When the determination result information represents that the mobile object is a vehicle, for each point of the road network of the mobile object, the longest stopover time calculation unit 16 calculates the longest stopover time $t_{max}$, at which the mobile object passes through each point of the road network when reducing speed from the initial speed to a predetermined minimum speed (a minimum speed provided to the road network-β) at a predetermined deceleration, on the basis of the mobile object route information output from the mobile object route candidate generation unit 14. The longest stopover time calculation unit 16 provides information relating to the calculated longest stopover time $t_{max}$ to the road network and outputs road network information relating to the road network to the collision determination unit 17. The longest stopover time calculation unit 16 sets the longest stopover time $t_{max}$ to be infinite ($t_{max}=\infty$) when the mobile object can stop in front of a certain point and does not pass through this point.

The collision determination unit 17 determines the possibility of collision between the host vehicle and the mobile object. The collision determination unit 17 receives the route candidate information output from the vehicle route candidate acquisition unit 11 and the road data information output from the shortest arrival time calculation unit 15 and the longest stopover time calculation unit 16. The collision determination unit 17 determines whether or not the passage time t at which the host vehicle passes through each point (x,y,t) of the route candidate represented by the route candidate information is greater than the shortest arrival time $t_{min}$ represented by the shortest arrival time information and smaller than the time $t_{max}$ represented by the longest stopover time information ($t_{min}<t<t_{max}$), and determines whether or not the speed V of the host vehicle is $V>V_m$. When it is determined that $t_{min}<t<t_{max}$ and $V>V_m$, the collision determination unit 17 determines that there is the possibility of collision between the host vehicle and the pedestrian, and outputs determination result information representing the effect. Note that $V_m$ is a value which is arbitrarily set and is preferably "0".

If the route candidate information output from the vehicle route candidate acquisition unit 11 and the road network information output from the shortest arrival time calculation unit 15 and the longest stopover time calculation unit 16 are received, when the position of the host vehicle interferes with the road network of the other vehicle, the collision determination unit 17 determines whether or not the passage time t at which the host vehicle passes through this point is greater than the shortest arrival time $t_{min}$ and smaller than the longest stopover time $t_{max}$ ($t_{min}<t<t_{max}$). When it is determined that $t_{min}<t<t_{max}$, the collision determination unit 17 determines that there is the possibility of collision between the host vehicle and the other vehicle, and outputs determination result information representing the effect. The output determination result information is received by, for example, a traveling status setting device. In the traveling status setting device, the best vehicle route candidate is selected on the basis of the determination result information of a plurality of vehicle route candidates, and a control signal is output to a driving control unit (not shown) or a steering control unit (not shown).

Figure 2:
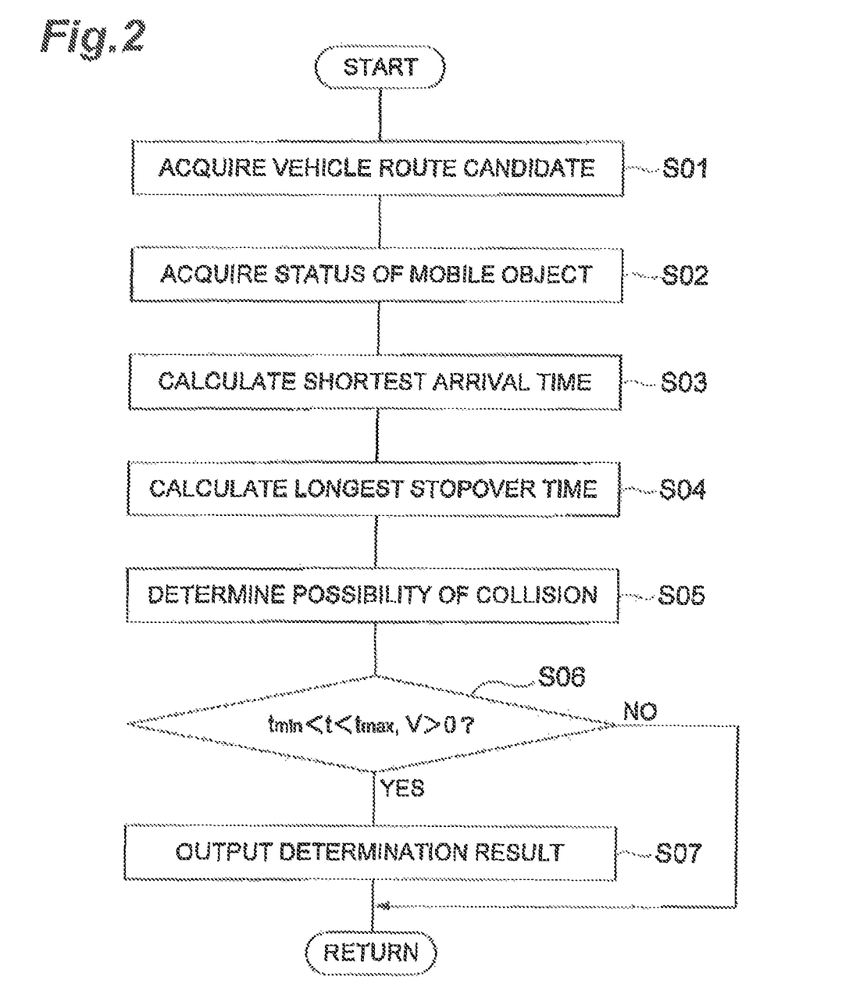
FIG. 2 is a flowchart showing the operation of the collision determination device.

Subsequently, the operation of the collision determination device 1 will be described with reference to FIGS. 2 to 4. Initially, a case where the mobile object is a pedestrian will be described. FIG. 2 is a flowchart showing the operation of the collision determination device, and FIGS. 3 and 4 are diagrams illustrating the operation of the collision determination device.

Figure 3:
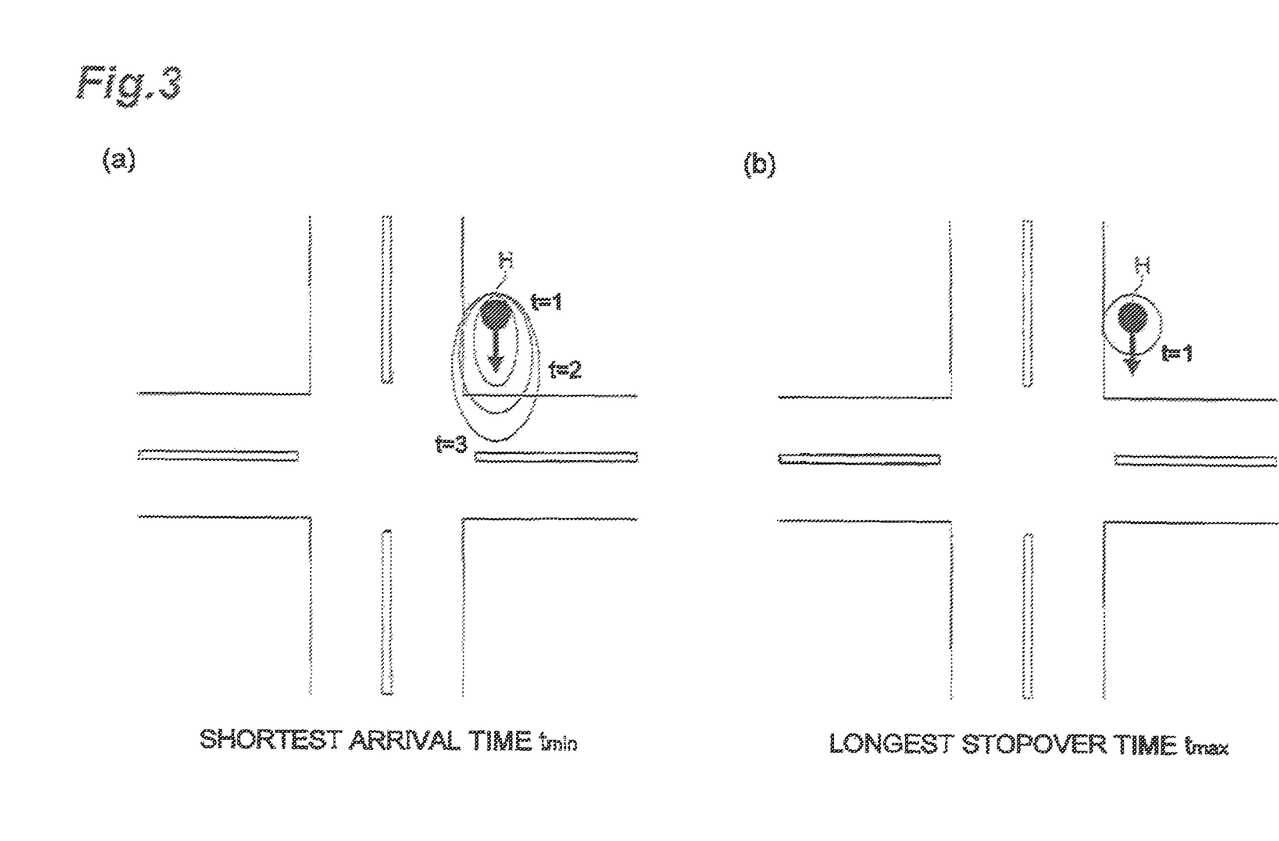
FIG. 3 is a diagram illustrating the operation of the collision determination device.

As shown in FIG. 3, first, a route candidate of the host vehicle is acquired by the vehicle route candidate acquisition unit 11 (Step S01). Next, the initial state (position, speed, direction, and the like) of a pedestrian (mobile object) is acquired by the mobile object status acquisition unit 12 (Step S02). Subsequently, the shortest arrival time $t_{min}$ is calculated by the shortest arrival time calculation unit 15 (Step S03). The longest stopover time $t_{max}$ is calculated by the longest stopover time calculation unit 16 (Step S04), and information relating to the shortest arrival time $t_{min}$ and the longest stopover time $t_{max}$ is provided to road data. Specifically, as shown in FIG. 3A, in a pedestrian H, the shortest arrival time $t_{min}=1, 2, 3, \ldots$ is calculated as the shortest arrival time $t_{min}$ for each point of the road. As shown in FIG. 3B, in the pedestrian H, the longest stopover time $t_{max}=1, 2, 3, \ldots, \infty$ is calculated as the longest stopover time $t_{max}$ for each point of the road. FIG. 3B shows only the longest stopover time $t_{max}=1$.

The determination on the possibility of collision is made by the collision determination unit 17 on the basis of road data, to which the shortest arrival time $t_{min}$ calculated by the shortest arrival time calculation unit 15 and the longest stopover time $t_{max}$ calculated by the longest stopover time calculation unit 16 are provided, and the passage time t at each point of the route candidate of the host vehicle acquired by the vehicle route candidate acquisition unit 11 (Step S05), and it is determined whether or not $t_{min}<t<t_{max}$ and $V>V_m$ (Step S06).

Figure 4:
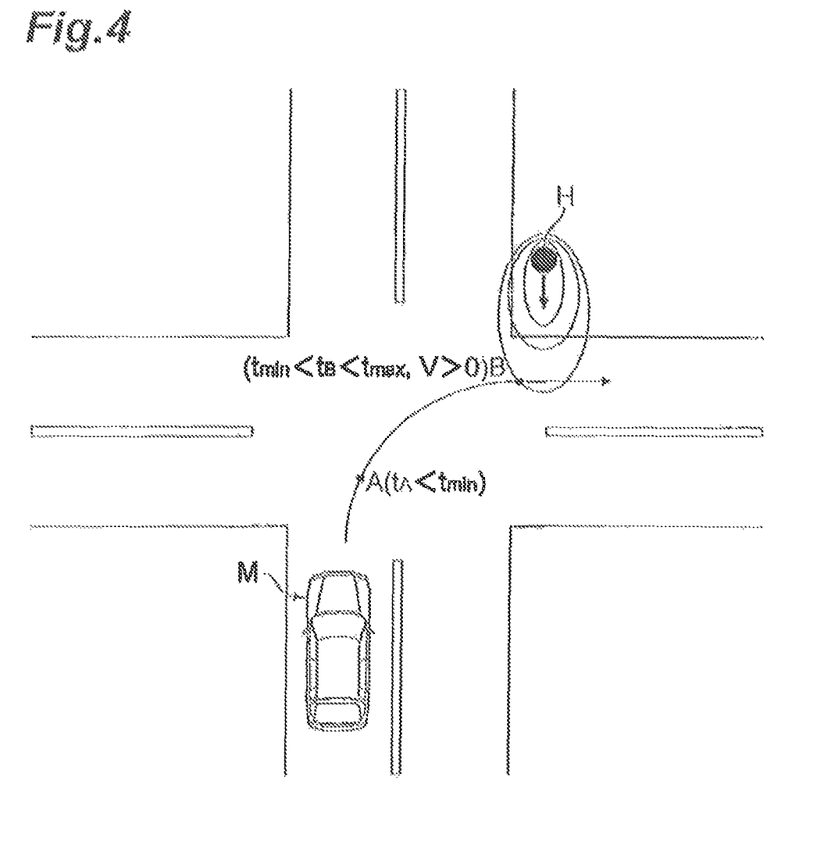
FIG. 4 is a diagram illustrating the operation of the collision determination device.

Specifically, as shown in FIG. 4, for example, when a host vehicle M passes through a point "A", since the passage time $t_A$ is smaller than the shortest arrival time $t_{min}$ ($t_A<t_{min}$), it is determined that there is no possibility of collision between the pedestrian H and the host vehicle M. For example, when the host vehicle M passes through a point "B", since the passage time $t_B$ is greater than the shortest arrival time $t_{min}$ and smaller than the longest stopover time $t_{max}$, and $V>V_m$ ($t_{min}<t<t_{max}$, $V>V_m$), it is determined that there is the possibility of collision between the pedestrian H and the host vehicle M. In Step S05, when it is determined that $t_{min}<t<t_{max}$ and $V>V_m$, the determination result representing the effect is output (Step S07). In Step S06, when it is determined that $t_{min}<t<t_{max}$ and $V>V_m$ are not established, the processing ends.

Figure 5:
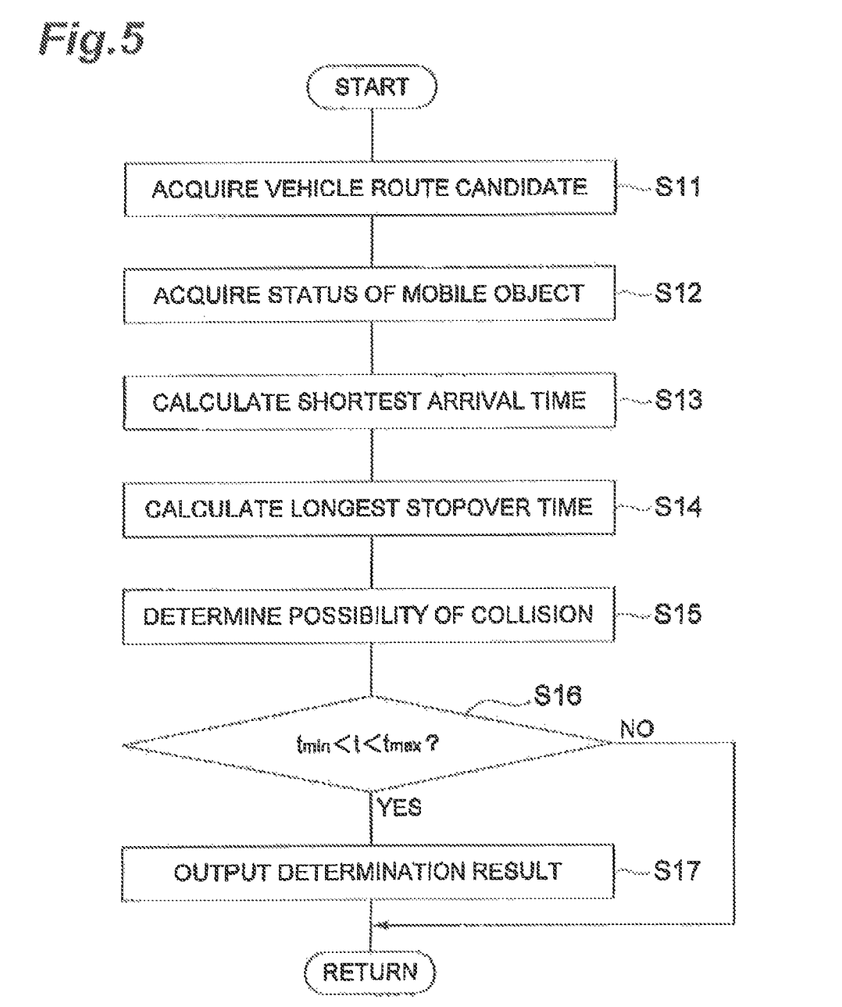
FIG. 5 is a flowchart showing another operation of the collision determination device.
Figure 6:
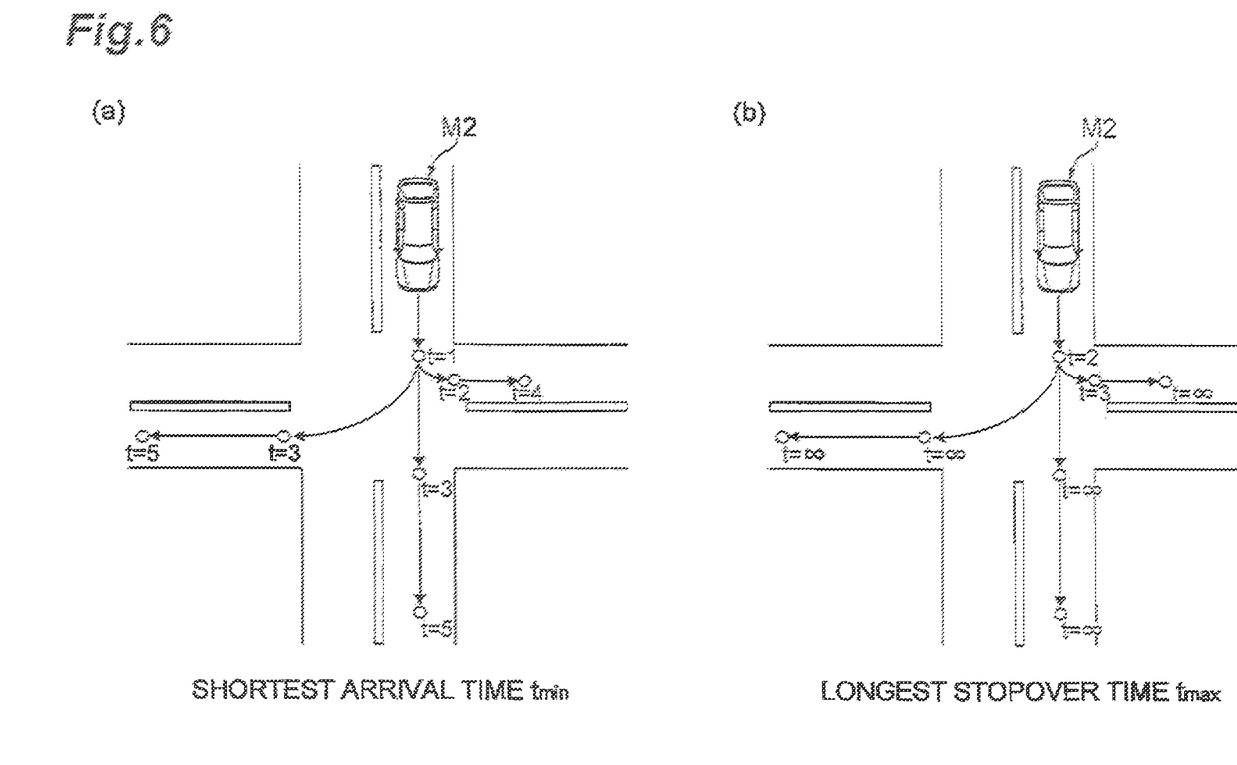
FIG. 6 is a diagram illustrating another operation of the collision determination device.

Next, a case where the mobile object is the other vehicle will be described. FIG. 5 is a flowchart showing the operation of the collision determination device, and FIGS. 6 and 7 are diagrams illustrating the operation of the collision determination device.

As shown in FIG. 5, first, a route candidate of the host vehicle is acquired by the vehicle route candidate acquisition unit 11 (Step S11). Next, the initial state (position, speed, direction, and the like) of the other vehicle (mobile object) is acquired by the mobile object status acquisition unit 12 (Step S12). Subsequently, the shortest arrival time $t_{min}$ is calculated by the shortest arrival time calculation unit 15 (Step S13). The longest stopover time $t_{max}$ is calculated by the longest stopover time calculation unit 16 (Step S14), and information relating to the shortest arrival time $t_{min}$ and the longest stopover time $t_{max}$ is provided to the road network. Specifically, as shown in FIG. 6A, in the other vehicle M2, the shortest arrival time $t_{min}=1, 2, 3, 4, 5, \ldots$ is calculated as the shortest arrival time $t_{min}$ for each point of the road network in the route candidate of the other vehicle M2. As shown in FIG. 6B, in the other vehicle M2, the longest stopover time $t_{max}=1, 2, 3, \ldots, \infty$ is calculated as the longest stopover time $t_{max}$ for each point of the road network in the route candidate of the other vehicle M2.

The determination on the possibility of collision is made by the collision determination unit 17 on the basis of the road network, to which the shortest arrival time $t_{min}$ calculated by the shortest arrival time calculation unit 15 and the longest stopover time $t_{max}$ calculated by the longest stopover time calculation unit 16 are provided, and the passage time t at each point of the route candidate of the host vehicle (Step S15), and it is determined whether or not $t_{min}<t<t_{max}$ (Step S16).

Figure 7:
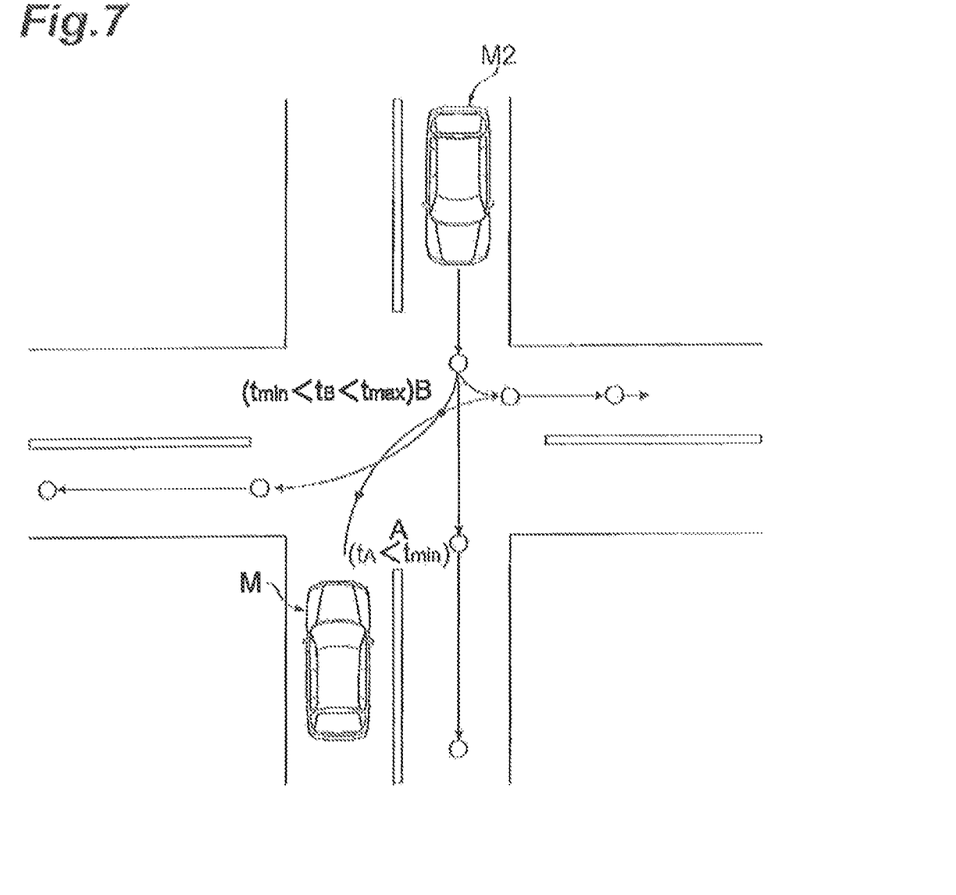
FIG. 7 is a diagram illustrating another operation of the collision determination device.

Specifically, as shown in FIG. 7, for example, when the host vehicle M passes through a point "A", since the passage time $t_A$ is smaller than the shortest arrival time $t_{min}$ ($t_A<t_{min}$), it is determined that there is no possibility of collision between the other vehicle M2 and the host vehicle M. For example, when the host vehicle M passes through a point "B", since the passage time to is greater than the shortest arrival time $t_{min}$ and smaller than the longest stopover time $t_{max}$ ($t_{min}<t<t_{max}$), it is determined that there is the possibility of collision between the other vehicle M2 and the host vehicle M. In Step S16, when it is determined that $t_{min}<t<t_{max}$, the determination result representing the effect is output (Step S17). In Step S15, when it is determined that $t_{min}<t<t_{max}$ is not established, the processing ends.

As described above, in the collision determination device 1, the possibility of collision between the host vehicle and the other object is determined on the basis of the shortest arrival time $t_{min}$ calculated by the shortest arrival time calculation unit 15 and the passage time t at each point of the host vehicle acquired by the vehicle route candidate acquisition unit 11. In this way, even if a locus to be taken by the other object is not generated, the shortest arrival time at which the other object can arrive at each point of the route candidate of the host vehicle with a predetermined first displacement is obtained, whereby it is possible to determine the possibility of collision between the host vehicle and the other object. Therefore, it is possible to reduce a computational load for determining collision and to accurately determine collision between the host vehicle and the other object. In this way, in the collision determination device, it is possible to reduce a processing load while avoiding collision with the other object.

When the shortest arrival time $t_{min}$ calculated by the shortest arrival time calculation unit 15 is smaller than the passage time t at each point of the route candidate of the host vehicle, the collision determination unit 17 determines that there is the possibility of collision between the host vehicle and the other object. When the shortest arrival time $t_{min}$ is smaller than the passage time t at each point of the route candidate of the host vehicle, collision between the host vehicle and the other object is avoided. Therefore, with the use of the relationship in which the shortest arrival time $t_{min}$ is smaller than the passage time t at each point of the route candidate of the host vehicle (shortest arrival time $t_{min}$<passage time t), it is possible to more appropriately determine the possibility of collision between the other object and the host vehicle.

When the shortest arrival time $t_{min}$, calculated by the shortest arrival time calculation unit 15 is smaller than the passage time t at each point of the route candidate of the host vehicle, and the speed V of the host vehicle is higher than a predetermined speed $V_m$, the collision determination unit 17 determines that there is the possibility of collision between the host vehicle and the other object. With this configuration, since the traveling status of the host vehicle is taken into consideration so as to determine the possibility of collision, it is possible to more accurately determine the possibility of collision between the host vehicle and the other object. Although in this embodiment, the determination on collision is performed using speed, any may be used insofar as collision can be quantitatively evaluated. For example, collision energy designated by the size of the mobile object or the like, the physical amount, such as impulse, or the like maybe used. Alternately, economic values may be provided to the mobile object for people and property, the amount of economic loss may be estimated, and the amount of loss may be used.

The collision determination device includes the longest stopover time calculation unit 16 which calculates the longest stopover time $t_{max}$, at which the mobile object passes through each point of the route candidate of the host vehicle acquired by the vehicle route candidate acquisition unit 11 when reducing speed, on the basis of the status of the mobile object acquired by the mobile object status acquisition unit 12. When the shortest arrival time $t_{min}$ calculated by the shortest arrival time calculation unit 15 is smaller than the passage time t at each point of the route candidate of the host vehicle, and the longest stopover time $t_{max}$ calculated by the longest stopover time calculation unit 16 is greater than the passage time t at each point of the route candidate of the host vehicle, the collision determination unit 17 determines that there is the possibility of collision between the host vehicle and the other object. With this configuration, since the possibility of collision is determined on the basis of a plurality of movement statuses of the other object, it is possible to determine the possibility of collision between the host vehicle and the other object with higher precision. As a result, it is possible to improve reliability.

Second Embodiment

Figure 8:
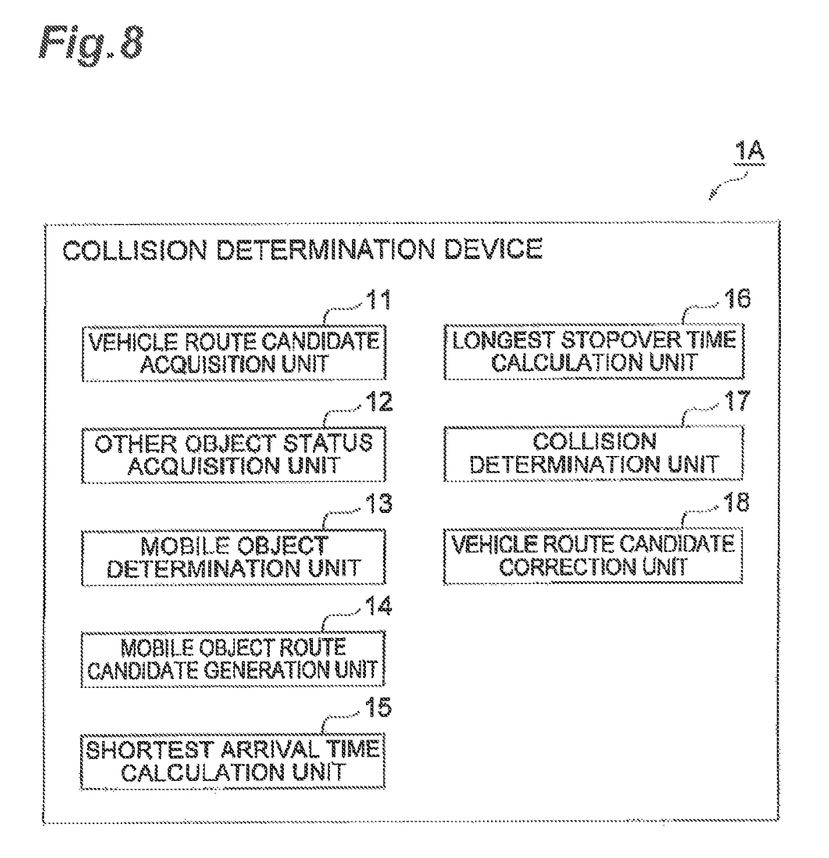
FIG. 8 is a block diagram showing the configuration of a collision determination device according to a second embodiment.

Subsequently, a collision determination device according to a second embodiment of the invention will be described. As shown in FIG. 8, a collision determination device 1A of the second embodiment is different from the first embodiment in that a vehicle route candidate correction unit (route candidate correction means) 18 is provided.

Figure 9:
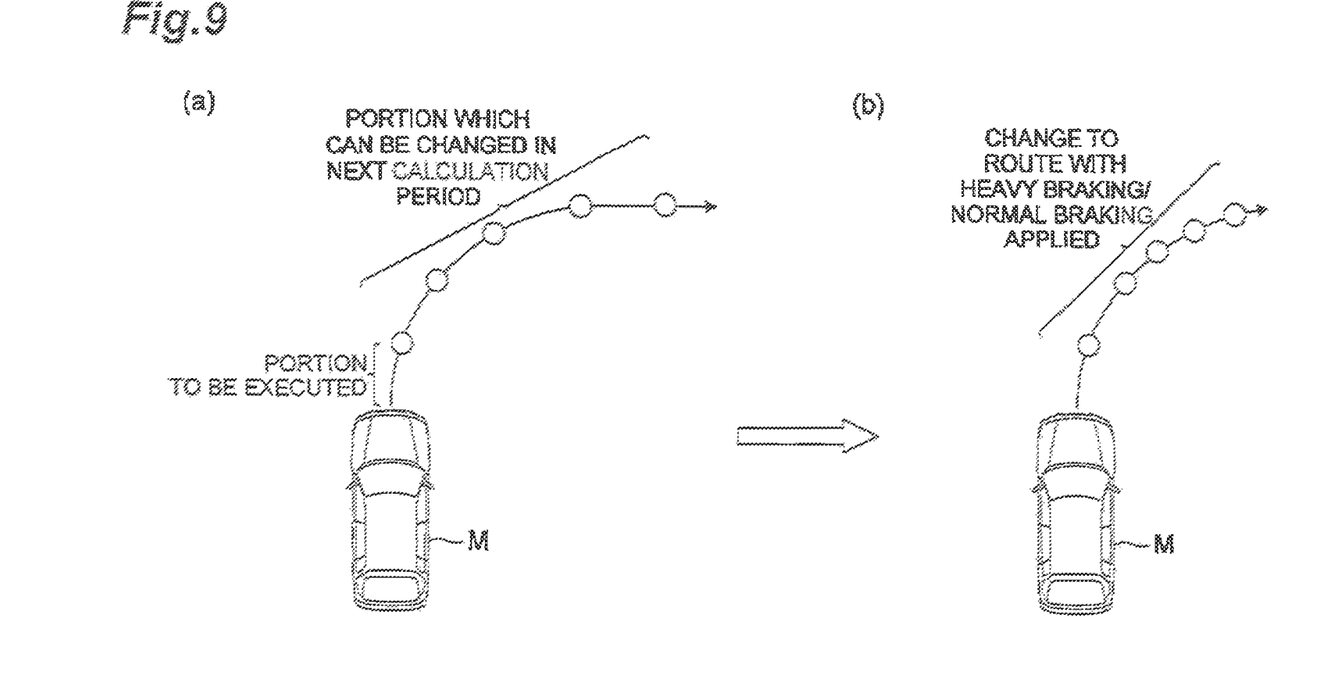
FIG. 9 is a diagram illustrating the operation of the collision determination device according to the second embodiment.

The vehicle route candidate correction unit 18 corrects the route candidate of the host vehicle acquired by the vehicle route candidate acquisition unit 11. If the route candidate information output from the vehicle route candidate acquisition unit 11 is received, the vehicle route candidate correction unit 18 partially changes and corrects (replaces) a portion ahead of a portion (predetermined point) to be surely executed by the host vehicle with the route of the host vehicle from this point of time as avoidance behavior. Preferably, the vehicle route candidate correction unit 18 generates a route candidate in which speed reduction is made, that is, the speed control quantity is changed in the route candidate represented by the host vehicle route candidate information is reduced. Specifically, as shown in FIG. 9A, the vehicle route candidate correction unit 18 replaces a portion ahead of a portion of the route candidate to be surely executed (a portion which may be changed in the next calculation period) with a route candidate when taking avoidance behavior with speed reduction from this point of time. n (1, 2, . . . , n) avoidance behaviors are set in advance, and for example, heavy braking, normal braking, and the like may be set. In addition, as avoidance behavior, sudden steering or sudden acceleration may be set.

As shown in FIG. 9B, for example, the vehicle route candidate correction unit 18 corrects a route in accordance with a route, in which the host vehicle M applies heavy braking, or avoidance behavior, in which the host vehicle M applies normal braking (for example, −0.1 G), as a route which takes avoidance behavior. Avoidance behavior which is selected (applied) by the vehicle route candidate correction unit 18 is replaced depending on whether a mobile object for determining the possibility of collision comparatively observes a condition (traffic classification, road direction, or the like) that movement is permitted, on the basis of the determination result information output from the mobile object determination unit 13. That is, avoidance behavior is selected and applied depending on whether the mobile object is a pedestrian or the other vehicle. The vehicle route candidate correction unit 18 outputs corrected route candidate information representing the corrected route candidate of the host vehicle to the shortest arrival time calculation unit 15, the longest stopover time calculation unit 16, and the collision determination unit 17.

If the corrected route candidate information output from the vehicle route candidate correction unit 18 is received, for each point of the route candidate of the host vehicle represented by the corrected route candidate information, the shortest arrival time calculation unit 15 calculates, as the shortest arrival time, the time $t_{min}$ at which the mobile object can arrive at each point of the route candidate of the host vehicle at earliest when taking behavior (for example, normal acceleration/deceleration or steering, or sudden acceleration/deceleration or sudden steering) in a behavior range (n: 1, . . . , n) associated with avoidance behavior of the host vehicle in the corrected route candidate information. The shortest arrival time calculation unit 15 provides information relating to the calculated shortest arrival time $t_{min}$ to road data or the road network, and outputs shortest arrival time information relating to road data or the road network to the collision determination unit 17.

If the corrected route candidate information output from the vehicle route candidate correction unit 18 is received, for each point of the route candidate of the host vehicle represented by the corrected route candidate information, the longest stopover time calculation unit 16 calculates, as the longest stopover time, the time (the latest time at which the mobile object passes by each point) $t_{max}$ at which the mobile object passes through each point of the route candidate when taking behavior (for example, normal acceleration/deceleration or steering, or sudden acceleration/deceleration or sudden steering) in a behavior range (n: 1, . . . , n) associated with avoidance behavior of the host vehicle in the corrected route candidate information. The longest stopover time calculation unit 16 provides information relating to the calculated longest stopover time $t_{max}$ to road data or the road network, and outputs longest stopover time information relating to road data or the road network to the collision determination unit 17.

If the shortest arrival time information output from the shortest arrival time calculation unit 15 and the longest stopover time information output from the longest stopover time calculation unit 16 are received, the collision determination unit 17 determines whether or not the passage time t at which the host vehicle passes through each point of the route candidate is greater than the shortest arrival time $t_{min}$ represented by the shortest arrival time information and smaller than the longest stopover time $t_{max}$ represented by the longest stopover time information ($t_{min}<t<t_{max}$). When it is determined that $t_{min}<t<t_{max}$, the collision determination unit 17 evaluates that there is the possibility of collision between the host vehicle and the pedestrian, and outputs evaluation result information representing the effect.

Figure 10:
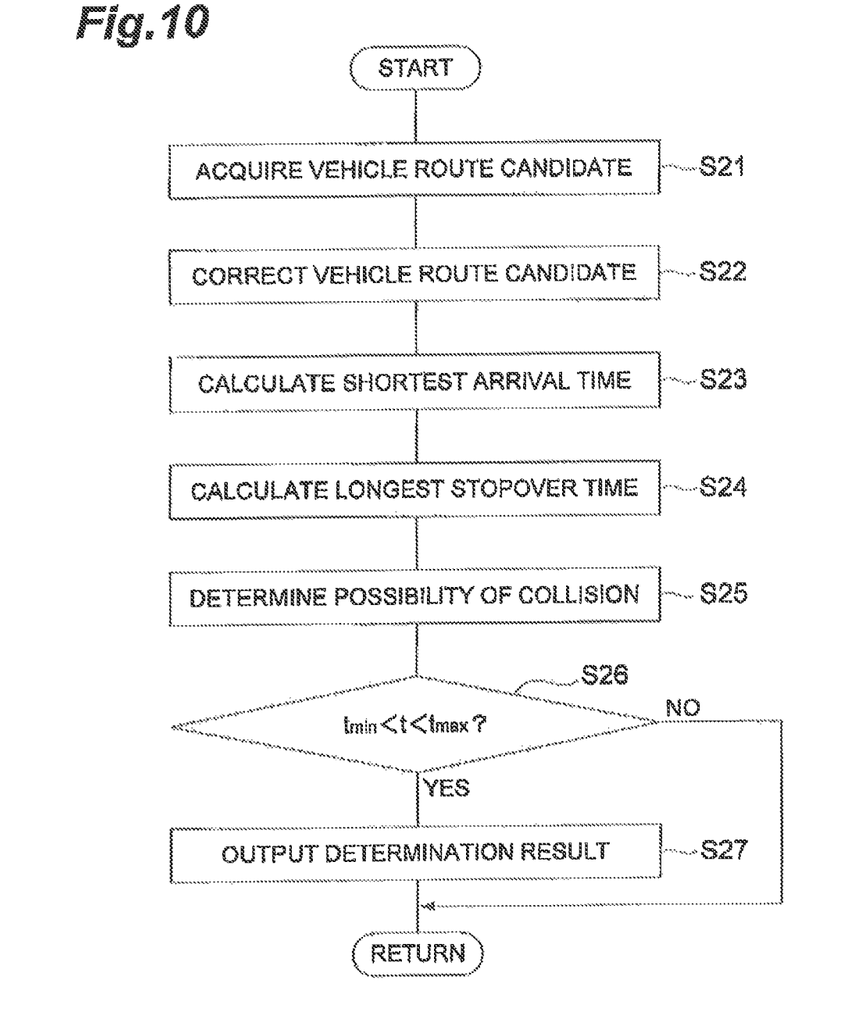
FIG. 10 is a flowchart showing the operation of the collision determination device according to the second embodiment.

Subsequently, the operation of the collision determination device 1A will be described with reference to FIG. 10. FIG. 10 is a flowchart showing the operation of the collision determination device.

As shown in FIG. 10, first, a route candidate of the host vehicle is acquired by the vehicle route candidate acquisition unit (Step S21). Next, the acquired route candidate of the host vehicle is corrected to a route candidate when taking avoidance behavior with speed reduction by the vehicle route candidate correction unit 18 (Step S22).

Subsequently, for each point of the corrected route candidate of the host vehicle, the shortest arrival time $t_{min}$ at which the mobile object can arrive at each point of the route candidate at earliest when taking behavior in a behavior range associated with avoidance behavior of the host vehicle is calculated by the shortest arrival time calculation unit 15 as the shortest arrival time (Step S23). For each point of the corrected route candidate of the host vehicle, the longest stopover time (the latest time at which the mobile object passes by each point) $t_{max}$ at which the mobile object passes through each point of the route candidate when taking behavior in a behavior range associated with avoidance behavior of the host vehicle is calculated by the longest stopover time calculation unit 16 as the longest stopover time (Step S24).

The determination on the possibility of collision is made by the collision determination unit 17 on the basis of the shortest arrival time $t_{min}$ calculated by the shortest arrival time calculation unit 15, the longest stopover time $t_{max}$ calculated by the longest stopover time calculation unit 16, and the passage time t at each point of the route candidate of the host vehicle corrected by the vehicle route candidate correction unit 18 (Step S25), and it is determined whether or not $t_{min}<t<t_{max}$ (Step S26). In Step S26, when it is determined that $t_{min}<t<t_{max}$, the determination result representing the effect is output (Step S27). In Step S26, when it is determined that $t_{min}<t<t_{max}$ is not established, the processing ends.

As described above, in the collision determination device 1A, the vehicle route candidate correction unit 18 corrects the route candidate to the route candidate when taking avoidance behavior (for example, heavy braking, normal braking, or the like) with speed reduction at the point of time ahead of a portion to be surely executed of the route candidate of the host vehicle. The collision determination unit 17 determines whether or not the time t at which the host vehicle passes through each point of the route candidate is greater than the shortest arrival time $t_{min}$ and smaller than the longest stopover time $t_{max}$ ($t_{min}<t<t_{max}$), and when $t_{min}<t<t_{max}$, determines that there is the possibility of collision between the host vehicle and the pedestrian. Therefore, for example, when the host vehicle waits for right turn, it is possible to avoid unnatural behavior in which the host vehicle enters immediately before a right turn waiting point without reducing speed and then applies heavy braking to stop. For this reason, the host vehicle can cope with normal behavior, in which the other vehicle travels in a straight line, with a slow acceleration, and even in the right turn waiting state or the like, natural behavior can be taken with slow deceleration.

In regard to a pedestrian, the host vehicle passes through a sideway with the minimum deceleration, and when the pedestrian comes out on a road, heavy braking is applied to reduce the speed of the host vehicle to "0" before collision. When generating the route candidate of the host vehicle, the possibility of collision between the mobile object and the host vehicle can be determined by generating only a portion (initial operation or the like) to be surely executed, thereby reducing the amount of calculation.

The invention is not limited to the foregoing embodiments. For example, although in the first embodiment, the shortest arrival time $t_{min}$ is calculated by the shortest arrival time calculation unit 15, the longest stopover time $t_{max}$ is calculated by the longest stopover time calculation unit 16, and the determination on the possibility of collision between the host vehicle and the mobile object is made by the collision determination unit 17 on the basis of the shortest arrival time $t_{min}$ and the longest stopover time $t_{max}$, the possibility of collision may be determined only using the shortest arrival time $t_{min}$. Specifically, the collision determination unit 17 determines that there is the possibility of collision when $t_{min}<t$ with respect to the passage time t at which the host vehicle passes through each point of the route candidate. In this case, since it is possible to determine the possibility of collision between the host vehicle and the mobile object with a small amount of computation, it is possible to further reduce a computational load. For this reason, even when prediction a few seconds later is required, it is possible to realize a driving support device which controls the host vehicle in real time.

The collision determination unit 17 may determine that there is the possibility of collision when $t_{min}<t$ and $V>V_m$ with respect to the passage time t at which the host vehicle passes through each point of the route candidate. In this case, since the speed of the host vehicle M is taken into consideration, it is possible to avoid the determination that there is the possibility of collision in a state where a pedestrian or the like runs into the host vehicle being parked.

Although in the second embodiment, a route candidate is corrected such that the host vehicle takes avoidance behavior (for example, heavy braking, normal braking, or the like) with speed reduction at the point of time ahead of a portion to be surely executed of the road network, avoidance behavior which is executed by the host vehicle may be set only to heavy braking. In this case, the vehicle route candidate correction unit 18 corrects the route candidate to a route in which the host vehicle applies heavy braking to stop, and the collision determination unit 17 determines that there is the possibility of collision when $t_{min}<t<t_{max}$ and $V>V_m$. Accordingly, since it is possible to determine the possibility of collision from the viewpoint that "collision avoidance may be still made by changing a route in the next calculation period", speed reduction is put off while securing that there is no collision, and as a result, the host vehicle can travel while securing efficiency.

REFERENCE SIGNS LIST

1 and 1A: collision determination device
11: vehicle route candidate acquisition unit (vehicle route candidate acquisition means)
12: mobile object status acquisition unit (mobile object status acquisition means)
15: shortest arrival time calculation unit (shortest arrival time calculation means)
16: longest stopover time calculation unit (longest stopover time calculation means)
17: collision determination unit (collision determination means)
20: vehicle route candidate correction unit (vehicle route candidate correction means)
M: host vehicle

The invention claimed is:

1. An electronic control unit for a vehicle, comprising:
a vehicle route candidate acquisition unit acquiring a route candidate of a host vehicle, the route candidate including a plurality of predetermined points;
an other object status acquisition unit acquiring the status of the other object;
a shortest arrival time calculation unit calculating a shortest arrival time, at which the other object can arrive at each point of the route candidate of the host vehicle acquired by the vehicle route candidate acquisition unit when moving with a predetermined first displacement, on the basis of the status of the other object acquired by the other object status acquisition unit; and
a collision determination unit determining the possibility of collision between the host vehicle and the other object on the basis of the shortest arrival time calculated by the shortest arrival time calculation unit and the passage time at each point of the host vehicle.

2. The electronic control unit according to claim 1, further comprising:
a mobile object determination unit determining whether the other object is a pedestrian or a vehicle; and
a mobile object route candidate generation unit calculating a road network representing an integrated state of a road which the vehicle should follow on the basis of information of a shape of a road in a vicinity of the vehicle, if the mobile object determination unit determines that the other object is the vehicle,
wherein the shortest arrival time calculation unit calculates the shortest arrival time at which the pedestrian arrives at each point when accelerating with a predetermined first displacement, if the mobile object determination unit determines that the other object is the pedestrian, and calculates the shortest arrival time at which the vehicle can arrive at each point of the road network when accelerating at a predetermined acceleration to a predetermined maximum speed greater than a maximum speed provided to the road network, on the basis of the road network calculated by the mobile object route candidate generation unit, if the mobile object determination unit determines that the other object is the vehicle.

3. The electronic control unit according to claim 2, further comprising:
a longest stopover time calculation unit calculating a longest stopover time, at which the other object passes through each point of the route candidate of the host vehicle acquired by the vehicle route candidate acquisition unit when reducing speed with a predetermined second displacement, on the basis of the status of the other object acquired by the other object status acquisition unit,
wherein the longest stopover time calculation unit calculates the longest stopover time at which the pedestrian arrives at each point when reducing speed with a predetermined second displacement, if the mobile object determination unit determines that the other object is the pedestrian, and calculates the longest stopover time at which the vehicle passes through each point when reducing speed at a predetermined deceleration to a predetermined minimum speed less than a minimum speed provided to the road network, relative to each point of the road network of the vehicle, based on the road network calculated by the mobile object route candidate generation unit, if the mobile object determination unit determines that the other object is the vehicle, and
the collision determination unit determines a possibility of collision between the host vehicle and the other object on the basis of the shortest arrival time calculated by the shortest arrival time calculation unit and the longest stopover time calculated by the longest stopover time calculation unit.

4. The electronic control unit according to claim 3, wherein the collision determination unit determines that there is a possibility that the host vehicle will collide with the other object, when the shortest arrival time calculated by the shortest arrival time calculation unit is smaller than the passage time at each point of the route candidate of the host vehicle, and the longest stopover time calculated by the longest stopover time calculation unit is greater than the passage time at each point of the route candidate of the host vehicle.

* * * * *